US010435148B2

(12) United States Patent
Kearney-Fischer

(10) Patent No.: US 10,435,148 B2
(45) Date of Patent: Oct. 8, 2019

(54) SYSTEMS AND METHODS FOR ACOUSTIC RADIATION CONTROL

(71) Applicant: Aurora Flight Sciences Corporation, Manassas, VA (US)

(72) Inventor: Martin Kearney-Fischer, Manassas, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 215 days.

(21) Appl. No.: 15/588,977

(22) Filed: May 8, 2017

(65) Prior Publication Data

US 2018/0319491 A1    Nov. 8, 2018

(51) Int. Cl.
*B64C 27/57*    (2006.01)
*B64C 11/30*    (2006.01)
(Continued)

(52) U.S. Cl.
CPC ............ *B64C 27/57* (2013.01); *B64C 11/305* (2013.01); *B64C 39/024* (2013.01);
(Continued)

(58) Field of Classification Search
CPC ..... B64C 27/57; B64C 39/024; B64C 11/305; B64C 2027/7205; B64C 11/46;
(Continued)

(56) References Cited

U.S. PATENT DOCUMENTS 4,689,821 A * 8/1987 Salikuddin et al. .........................
G10K 2210/1281
381/71.9
5,150,855 A * 9/1992 Kaptein ............... G10K 11/175
244/1 N
(Continued)

FOREIGN PATENT DOCUMENTS

WO    2017/053634    3/2017

OTHER PUBLICATIONS

Extended European search report, dated Jun. 19, 2018, in European Patent Application No. 18169650.1.
(Continued)

*Primary Examiner* — Dale W Hilgendorf
(74) *Attorney, Agent, or Firm* — Michael Stanley Tomsa; McAndrews, Held & Malloy, Ltd.; Eugene H. Nahm

(57) ABSTRACT

Disclosed is a system for controlling acoustic radiation from an aircraft. The system comprising a plurality of rotor systems (one or more) and a noise controller configured to regulate acoustic radiation from the plurality of rotor systems. The noise controller can be configured to regulate a commanded flight setting from the flight control system and to output a regulated flight setting to the plurality of rotor systems. Based on the regulated flight setting, the plurality of rotor systems are configured to generate, individually and in aggregate, acoustic radiation having a target acoustic behavior. The target acoustic behavior may be achieved using beamforming techniques to, for example, change the
(Continued)

directionality of acoustic radiation from the plurality of rotor systems, or otherwise tune the acoustic radiation to reduce detectability and/or annoyance.

23 Claims, 6 Drawing Sheets

(51) Int. Cl.
  *B64C 39/02* (2006.01)
  *G10K 11/175* (2006.01)
  *G10K 11/178* (2006.01)
  *B64C 11/46* (2006.01)
  *B64C 27/72* (2006.01)

(52) U.S. Cl.
  CPC ........ *G10K 11/175* (2013.01); *G10K 11/1781* (2018.01); *G10K 11/17813* (2018.01); *B64C 11/46* (2013.01); *B64C 2027/7205* (2013.01); *B64C 2201/024* (2013.01); *B64C 2220/00* (2013.01); *G10K 2200/10* (2013.01); *G10K 2210/1281* (2013.01)

(58) Field of Classification Search
  CPC .......... B64C 2220/00; B64C 2201/024; G10K 11/17813; G10K 11/1781; G10K 11/175; G10K 2200/10; G10K 2210/1281
  See application file for complete search history.

(56) References Cited

U.S. PATENT DOCUMENTS

| | | | | |
|---|---|---|---|---|
| 5,293,425 A | * | 3/1994 | Oppenheim et al. | ........................ G10K 2210/1281 381/71.8 |
| 5,453,943 A | * | 9/1995 | Magliozzi | ............ G10K 11/175 381/71.4 |
| 5,568,557 A | * | 10/1996 | Ross et al. | ...... G10K 2210/1281 381/71.4 |
| 6,224,021 B1 | * | 5/2001 | Tanaka | .................. B64C 11/305 244/221 |
| 6,671,590 B1 | * | 12/2003 | Betzina et al. | ........ B64C 27/001 701/3 |
| 6,896,219 B2 | * | 5/2005 | Borchers et al. | .... G10K 11/175 244/1 N |
| 8,194,502 B1 | | 6/2012 | Croft, III | |
| 9,415,870 B1 | * | 8/2016 | Beckman et al. | .... B64C 39/024 |
| 2012/0068005 A1 | * | 3/2012 | Kessler et al. | ........ B64C 27/001 244/17.13 |
| 2013/0056581 A1 | * | 3/2013 | Sparks | ................. G10K 11/175 701/3 |
| 2015/0125268 A1 | * | 5/2015 | Koopmann et al. | ........................ B64C 2220/00 415/119 |

OTHER PUBLICATIONS

Palumbo, D. et al. (2016) "Perceived Annoyance to Noise Produced by a Distributed Electric Propulsion High Lift System," AIAA Aviation Conference Jun. 13-17, 2016, Washington, DC, NASA Document ID 20160010020.

Rizzi, S. (2016) "Toward Reduced Aircraft Community Noise Impact via a Perception-Influenced Design Approach," Inter-Noise Conference, Hamburg, Germany.

* cited by examiner

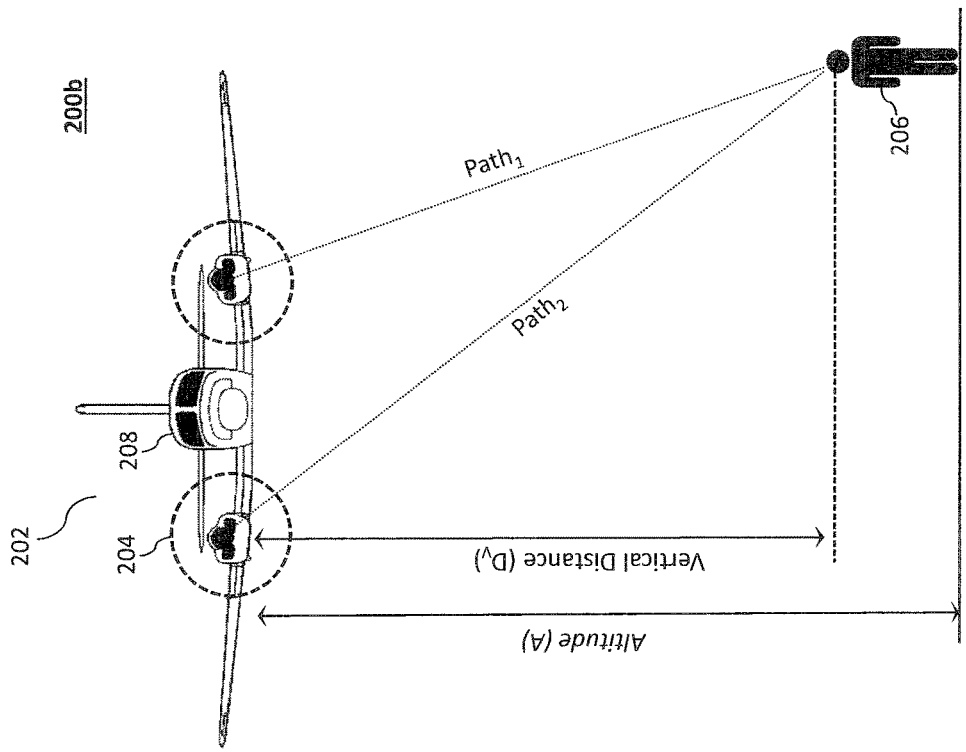
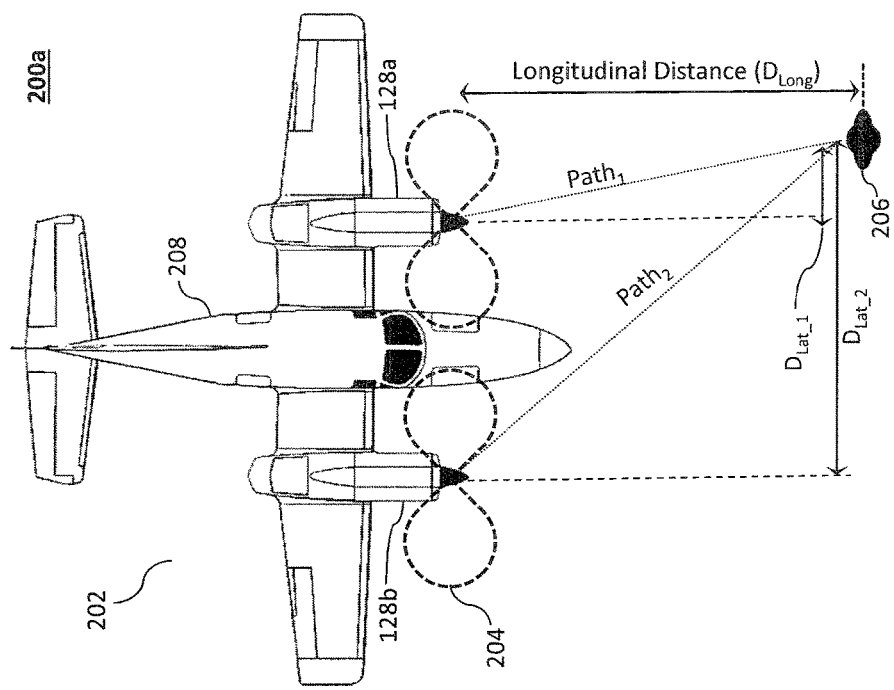
Figure 2a
Figure 2b

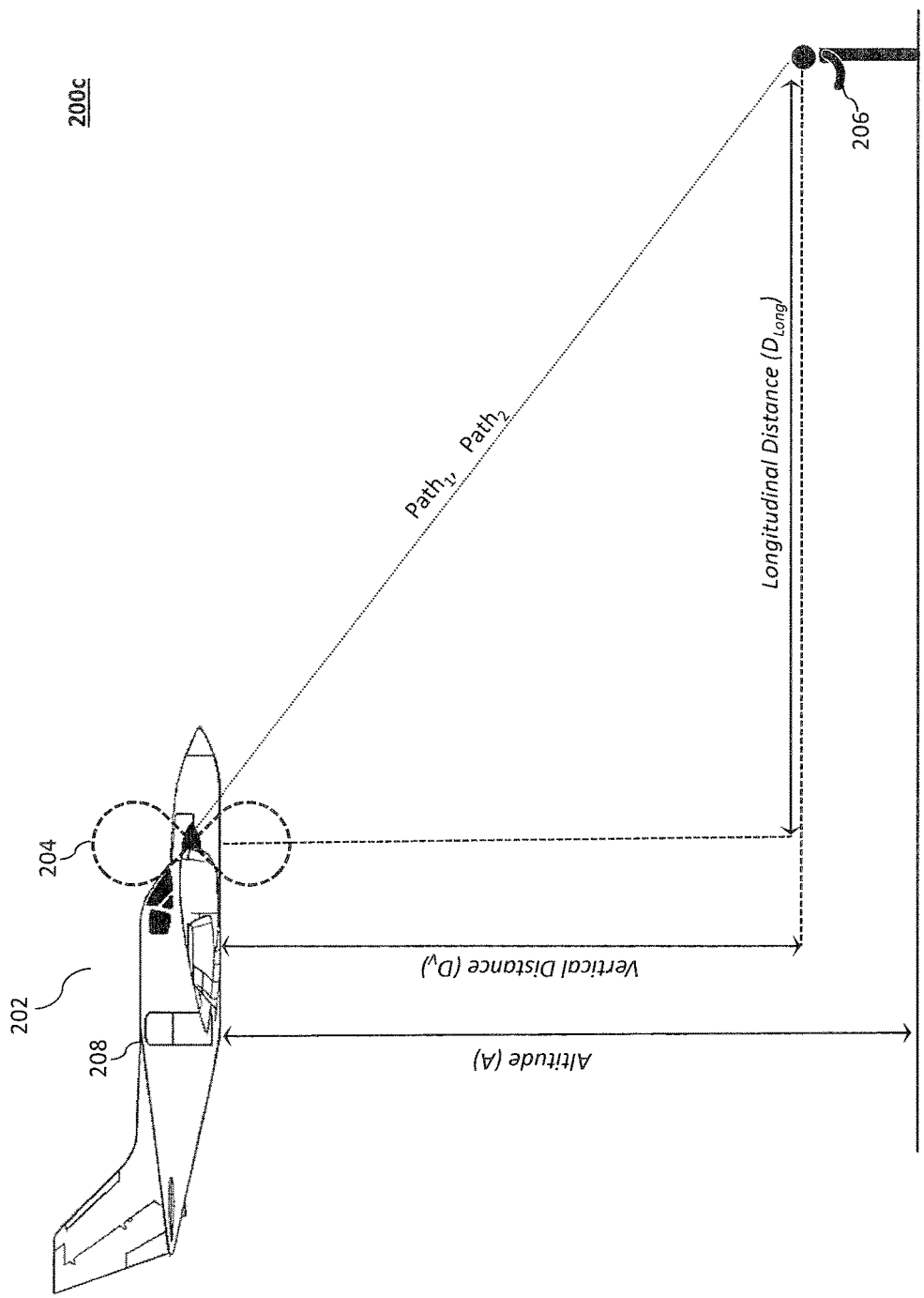

SYSTEMS AND METHODS FOR ACOUSTIC RADIATION CONTROL

TECHNICAL FIELD

The present invention relates to a system and method for controlling acoustic radiation, more specifically to a system and method for controlling the acoustic radiation generated and/or emitted by an aircraft's propellers, fans, and/or rotors.

BACKGROUND

Managing the aural characteristics (the combination of the all of the acoustically radiating sources) of an aircraft is important in many environments. Minimizing annoyance to passengers and people on the ground (known as noise pollution) is important to civil applications, while avoiding detection is important to military aircraft utility. Indeed, noise pollution, and the desire to control (or reduce) it, has resulted in significant regulation preventing or otherwise inhibiting, operation of aircraft in close proximity to people and/or residential areas. Furthermore, this acoustic radiation has significant directionality and can propagate long distances. Beyond nuisance, high-intensity noise produced in certain applications can pose a health risk and can even pose a risk to nearby materials' structural integrity.

Rotor-driven aircraft are particularly prone to generate acoustic radiation, where the aircraft's rotors/propellers are a dominant source of acoustic radiation. Accordingly, acoustic radiation emitted by propellers/fans/rotors is an undesirable byproduct of their primary function—to generate thrust/propulsion. In view of the foregoing, a need exists for a system and method for controlling the acoustic radiation emitted by an aircraft, such as the aircraft's propellers, fans, and/or rotors.

SUMMARY OF THE INVENTION

The present invention is directed to a system and method for controlling the acoustic radiation emitted by aircraft.

According to a first aspect, a system for controlling acoustic radiation in an aircraft comprises: one or more rotor systems, each of the one or more rotor systems having a rotor, a motor to rotate the rotor, and a rotor controller to control the operation of the motor, wherein, upon receipt of a commanded flight setting from a flight control system, the one or more rotor systems are configured to generate, individually and in aggregate, desired acoustic radiation having a first acoustic behavior; and a noise controller operatively coupled with the flight control system and each of the one or more rotor systems to regulate acoustic radiation from the one or more rotor systems, wherein the noise controller is configured to regulate the commanded flight setting from the flight control system and to output a regulated flight setting to the one or more rotor systems, and wherein, upon receipt of the regulated flight setting from the noise controller, the one or more rotor systems are configured to generate, individually and in aggregate, acoustic radiation having a second acoustic behavior that is different from the first acoustic behavior.

According to a second aspect, a system for controlling acoustic radiation comprises: one or more rotor systems, each of the one or more rotor systems having a rotor, a motor to rotate the rotor, and a rotor controller to control an operation of the motor; and a noise controller operatively coupled with a flight control system and each of the one or more rotor systems to regulate acoustic radiation from the one or more rotor systems, wherein the noise controller is configured to receive a commanded flight setting from the flight control system and to output a regulated flight setting to the one or more rotor systems to regulate the acoustic radiation from the one or more rotor systems to comply with a target acoustic behavior.

In certain aspects, the noise controller is configured to employ one or more beamforming techniques to adjust directionality of the acoustic radiation to comply with the target acoustic behavior.

In certain aspects, the noise controller is configured to provide feedback to a control interface reflecting present and future performance of the system.

In certain aspects, the noise controller regulates the commanded flight setting based at least in part on noise configuration data from a noise control interface coupled to the noise controller.

In certain aspects, the system further comprises one or more input modules, wherein the noise controller regulates the commanded flight setting based at least in part on operating parameter data from said one or more input modules.

In certain aspects, the noise configuration data specifies a target acoustic behavior.

In certain aspects, the noise controller compares the second acoustic behavior with the target acoustic behavior to determine whether the second acoustic behavior complies with the target acoustic behavior.

In certain aspects, the noise controller employs beamforming techniques to adjust directionality of the acoustic radiation from the one or more rotor systems.

In certain aspects, directionality of acoustic radiation from the one or more rotor systems is controlled by regulating the frequency content and phase of each rotor within the one or more rotor systems.

In certain aspects, the noise controller is configured to control thrust from each rotor within the one or more rotor systems by regulating each rotor's blade pitch.

In certain aspects, each of the one or more rotor systems includes a rotor feedback device to provide feedback to the noise controller.

In certain aspects, the noise controller is configured to communicate the feedback from each rotor feedback device to the flight control system.

In certain aspects, the operating parameter data includes at least one of: (1) flight setting adjustment limits; (2) one or more models for the rotor controller; and (3) aircraft configuration.

According to a third aspect, a method for controlling acoustic radiation in an aircraft having a one or more rotor systems comprises: receiving, at a noise controller, a commanded flight setting from a flight control system; receiving, from a noise control interface, noise configuration data, wherein the noise configuration data specifies a target acoustic behavior for the one or more rotor systems; regulating the commanded flight setting to generate a regulated flight setting, wherein the regulated flight setting is generated based at least in part on the noise configuration data; and communicating the regulated flight setting to at least one of the one or more rotor systems.

In certain aspects, the method further comprises the step of determining an acoustic behavior for the one or more rotor systems generated in response to the regulated flight setting.

In certain aspects, the method further comprises the step of comparing the acoustic behavior generated in response to the regulated flight setting with the target acoustic behavior.

In certain aspects, the method further comprises the step of regulating the regulated flight setting if the acoustic behavior does not comply with the target acoustic behavior.

In certain aspects, the regulated flight setting employs beamforming techniques to change the directionality of acoustic radiation from the one or more rotor systems.

In certain aspects, the regulated flight setting regulates the frequency content and phase of each motor within the one or more rotor systems to change the directionality of acoustic radiation from the one or more rotor systems.

In certain aspects, the method further comprises the step receiving, from one or more input modules, operating parameter data, wherein the regulated flight setting is generated based at least in part on the operating parameter data.

In certain aspects, the operating parameter data includes at least one of: (1) flight setting adjustment limits; (2) one or more models for the rotor controller; and (3) aircraft configuration.

In certain aspects, the method further comprises the step of tuning each motor within the one or more rotor systems to distribute the acoustic energy across a range of frequencies as possible or otherwise optimize the acoustic character of each motor to reduce detectability and/or annoyance.

DESCRIPTION OF THE DRAWINGS

These and other advantages of the present invention will be readily understood with the reference to the following specifications and attached drawings wherein:

FIGS. 2a through 2c illustrate acoustic radiation patterns emitted by an example fixed wing aircraft vis-à-vis a distant observer.

DETAILED DESCRIPTION

Figure 1:
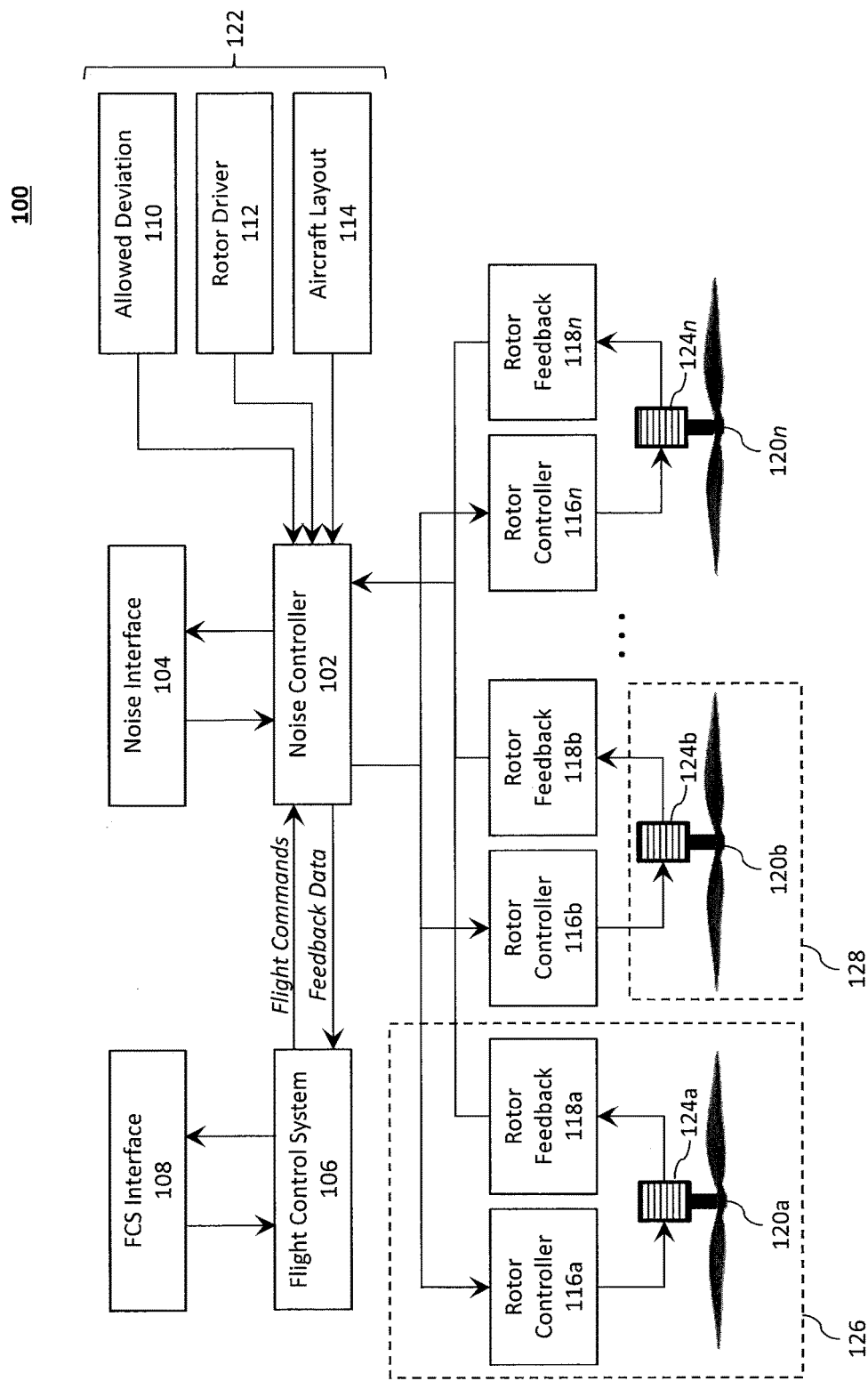
FIG. 1 illustrates an architecture of an example acoustic radiation control system.

Preferred embodiments of the present invention will be described hereinbelow with reference to the accompanying drawings. The components in the drawings are not necessarily drawn to scale, the emphasis instead being placed upon clearly illustrating the principles of the present embodiments. For instance, the size of an element may be exaggerated for clarity and convenience of description. Moreover, wherever possible, the same reference numbers are used throughout the drawings to refer to the same or like elements of an embodiment. In the following description, well-known functions or constructions are not described in detail because they may obscure the invention in unnecessary detail. No language in the specification should be construed as indicating any unclaimed element as essential to the practice of the embodiments. In the following description, it is understood that terms such as "first," "second," "top," "bottom," "side," "front," "back," and the like, are words of convenience and are not to be construed as limiting terms. For this application, the following terms and definitions shall apply:

As used herein, the words "about" and "approximately," when used to modify or describe a value (or range of values), mean reasonably close to that value or range of values. Thus, the embodiments described herein are not limited to only the recited values and ranges of values, but rather should include reasonably workable deviations. The terms horizontal and vertical, as used herein, are used to describe angles or planes relative to the ground, such as when the aircraft is on the ground.

As used herein, the terms "aerial vehicle" and "aircraft" refer to a machine capable of flight, including, but not limited to, fixed-wing aircraft, unmanned aerial vehicle, variable wing aircraft, and vertical take-off and landing (VTOL) aircraft. VTOL aircraft may include fixed-wing aircraft (e.g., Harrier jets), rotorcraft (e.g., helicopters), tilt-rotor/tilt-wing aircraft, multi-rotor aircraft, etc.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

As used herein, the terms "communicate" and "communicating" refer to both transmitting, or otherwise conveying, data from a source to a destination and delivering data to a communications medium, system, channel, network, device, wire, cable, fiber, circuit, and/or link to be conveyed to a destination.

As used herein, the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code.

As used herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

As used herein, the term "processor" means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with a memory device.

As used herein, the term "memory device" means computer hardware or circuitry to store information for use by a processor. The memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

As used herein, the term "rotor" means a device having a central hub with one or more radiating blades to convert rotary motion to produce thrust and/or a propulsive force. Example rotors include, without limitation, aircraft propellers, fans, integrally bladed rotors (IBR), bladed disks (e.g., blisks), and helicopter rotors.

Disclosed herein is a system and method for controlling acoustic radiation emitted by an aircraft, including the aircraft's rotor assembly (e.g., a propeller, or other rotor, driven by a mechanical device). While existing solutions attempt to mitigate acoustic radiation through the design of quiet rotor blades, quiet motors, etc., these existing solutions do not address the acoustic radiation sources as a collective, which can be managed as a whole to yield more effective results. There are tunings that can be applied in real-time to the operation of the one or more rotors to make the radiated energy less perceptible and/or less annoying to an acoustic area of interest (e.g., persons on the ground), however they do not address the acoustic radiation sources as a collective either.

The disclosed acoustic radiation control system offers a number of advantages over existing solutions for controlling acoustic radiation, which traditionally sustain significant performance and/or operational penalties. For example, one solution for controlling acoustic radiation is to reduce thrust by controlling rotational speed and/or disk loading, thus reducing acoustic radiation. Another solution for controlling acoustic radiation requires narrowly defined flight profiles. The acoustic radiation control system disclosed herein, however, manages aggregate noise from one or more of rotor systems as a collective set using a central noise controller (i.e., managing the noise sources together). The noise controller can therefore alter the aggregate acoustic radiation of the aircraft in ways that were not previously possible when the noise sources are allowed to operate independently of one another. Integrating the acoustic radiation control system into an aircraft's propulsion control system makes it possible to tailor the acoustic radiation produced from one or more rotors, for example, controlling perceptibility and/or annoyance to an acoustic area of interest without critically compromising the rotor's primary role of sustaining flight.

FIG. 1 illustrates an architecture of an example acoustic radiation control system 100 employed in an aircraft (e.g., fixed wing aircraft 202, multi-rotor aerial vehicle 300). As can be appreciated, however, the components of the acoustic radiation control system 100 may be varied across the different types of aircraft configurations (e.g., turbo-prop, all electric, hybrid electric), but the underlying principles of the acoustic radiation control system 100 remain applicable, regardless of the aircraft configuration and type of rotor assembly 128.

As illustrated, the acoustic radiation control system 100 may comprise a central noise controller 102, a noise control interface 104, a flight control system 106, a flight control system interface 108, a plurality of input modules 122, and a plurality of rotor systems 126. Each of the plurality of rotor systems 126 may include a rotor assembly 128 (e.g., a combination of a rotor 120 and a mechanical device 124 to rotate the rotor 120), a rotor controller 116, and/or a rotor feedback device 118. The plurality of input modules 122 may include, for example, an allowed deviation module 110, a rotor driver module 112, and an aircraft layout module 114.

The noise controller 102 couples (e.g., monitors and controls) the plurality of rotor systems 126 to create a radiating array. In operation, the radiating array can dynamically (e.g., continuously in real-time or near real-time) set one or more of the control parameters for each rotor assembly 128. The control parameters may include, for example, revolutions per minute (RPM), blade pitch, and phase for each mechanical device 124 (e.g., an electric motor). The control parameters may be selected by the noise controller 102 such that the rotor systems 126 operate within acceptable operating ranges, which can be specified by a primary function set point (e.g., desired thrust setting). The acoustic radiation control system 100 may use high bandwidth, fast response motor controllers. Each rotor system 126 may provide, as feedback, precise motor state information (e.g., via a rotor controller 116 and/or a rotor feedback device 118), which may be facilitated using, for example, high-precision rotation position encoders.

Noise Management Components.

The primary noise management components include a noise controller 102 communicatively coupled with a noise control interface 104. The noise control interface 104 enables a high-level operator (e.g., an autopilot, human pilot, etc.) to interface, or otherwise communicate, with the noise controller 102 to facilitate noise management. For example, the noise control interface 104 may enable the high-level operator to input a desired noise configuration (or otherwise regulate the noise profile) to generate noise configuration data that may be passed to the noise controller for processing.

The noise control interface 104 may be an interface to communicate with another system (e.g., autopilot), or include one or more user-actuated input devices for use by a human operator. The one or more user-actuated input devices may include, for example, physical buttons, physical switches, a digitizer (whether a touch pad, or transparent layer overlaying a display device), and other input devices. The noise control interface 104 may further include one or more display devices, such as one or more light emitting diodes (LEDs), liquid crystal display (LCD) screens, speakers, alarms, etc. The one or more user-actuated input devices may be local (i.e., on the aircraft) or remote (e.g., off the aircraft and communicatively coupled via a network, such as wireless communication). The noise control interface 104 may provide feedback information on how the commanded flight behaviors impact the acoustic signature of the aircraft (e.g., pitching up may project more acoustic energy forward, rapid throttle changes will be more noticeable), possibly including indication of performance metrics with regard to achieving a desired acoustic signature and how aircraft maneuvering impacts the metrics (e.g., experienced perceived noise level (EPNL)) or violates thresholds (e.g., operating requirements over a residential area require do not exceed n dB). This feedback may be provided in real-time or forward predicted to facilitate flight planning or operation (e.g., staying on this descent profile will violate the desired perception threshold in n seconds). This feedback many be utilized by a human or an autonomous controller to plan, execute, and/or monitor the acoustic performance of the aircraft. As one example, the feedback may be provided in a form useful to a route planning routine to balance the acoustic impact of a route against other cost parameters (e.g., fuel burn, flight time, etc.).

The noise control interface 104 may be integrated with (or incorporate therein), for example, a geographic information system (GIS). The GIS may be used to automatically determine a desired acoustic management technique for a given location and flight operation based, at least in part, on geographic conditions, structures, population distributions, other GIS data. To that end, the GIS may be employed to capture, store, check, and/or display data related to the geography of Earth's surface. The GIS may further display and/or provide map data to enable the noise controller 102 to comprehend and analyze geographic features of the Earth's surface.

The noise controller 102 includes one or more processors operatively coupled with at least one memory device to execute the one or more noise control processes and/or algorithms stored to the memory device(s). The noise controller 102 is communicatively coupled between the flight control system 106 and a plurality of rotor systems 126. In operation, the noise controller 102 receives and regulates (e.g., modifies) one or more commanded flight settings (e.g., rotor assembly commands and/or navigational commands) from the flight control system 106.

The one or more commanded flight settings are regulated by the noise controller 102 to yield one or more one or more regulated flight settings, which may then be passed to each of the plurality of rotor systems 126. For example, the noise controller 102 may determine (e.g., through modeling and/or actual measurements) that the commanded flight settings may, when communicated to the plurality of rotor systems 126, yield an acoustic behavior that differs from a target acoustic behavior identified via the noise control interface 104. To achieve the target acoustic behavior, the regulated flight settings are communicated to the plurality of rotor systems 126 to adjust the aggregate acoustic behavior.

The noise controller 102 may further monitor one or more parameters of each of the rotor systems 126 using a rotor feedback device 118 at each rotor system 126. The noise controller 102 communicates the one or more parameters as a rotor/propeller position data-stream from the rotor system 126 back to the flight control system 106.

The mechanical devices 124 can be further tuned to distribute the acoustic energy into as wide a range of frequencies as possible, which can be accomplished by selecting different RPM settings for each mechanical device 124 and/or varying the RPM settings rapidly over time. This spreading of energy inhibits constructive interference and otherwise reduces the prominence of tones or other attributes that may be easily perceived or regarded as annoying.

The noise modification schemes applied by the noise controller 102 are designed to incorporate operating parameter data from one or more of a plurality of input modules 122. The operating parameter data may reflect operating information and/or parameters (i.e., operating limits). The operating information and/or parameters may include, for example, a desired noise modification scheme, one or more parameters of the particular noise modification scheme (e.g., a beam direction when beamforming is employed), flight setting adjustment limits (e.g., from an allowed deviation module 110), one or more models for the rotor controller 116 (e.g., from the rotor driver module 112), aircraft configuration data (e.g., from the aircraft layout module 114), etc.

The noise controller 102 utilizes the noise configuration data and the operating parameter data, as well any internally structured schemes, to determine how to regulate the commanded flight settings from the flight control system 106 to achieve a targeted acoustic behavior or otherwise comply with the targeted acoustic behavior (i.e., within an predetermined acceptable deviation from the targeted acoustic behavior). The noise controller 102 may further communicate status information (e.g., feedback data) to the noise control interface 104 or the flight control system 106. The status information may include information and/or feedback on the current state of the noise control scheme. The status information may further include noise modifications that the noise controller 102 can produce given the limits of a particular implementation (e.g., based on aircraft configuration).

Input Modules 122.

As noted above, the noise controller 102 may be communicatively coupled with a plurality of input modules 122, such as an allowed deviation module 110, a rotor driver module 112, and an aircraft layout module 114. Each of the plurality of input modules 122 may employ any combination of hardware, firmware, and software that is capable of performing the function associated with the respective module, including, without limitation, a processor (or other circuitry) coupled to a memory device. The operating parameter data from the plurality of input modules 122 is used by the noise controller 102 to limit and/or direct how the commanded flight settings are regulated, or otherwise altered.

The allowed deviation module 110 may be configured to impose a set of system limits (e.g., permissible variances) to restrict the degree by which the noise controller 102 can alter the commanded flight settings from the flight control system 106 without compromising flight characteristics or safety of the aircraft. The system limits may be provided in any number of ways (e.g., ranges, acceptable percentage deviations) which may change in real-time throughout the flight. These limits will likely have complex relationships with different flight phases, weather conditions, etc. For example, the allowed deviation module 110 may indicate that the aircraft is taking off at its maximum (or near maximum) gross takeoff weight and, therefore, will require all available thrust to achieve liftoff. Conversely, during descent, the allowed deviation module 110 may indicate that the rotor assemblies 128 may be throttled down to an idle speed or a near idle speed.

The allowed deviation module 110 may further impose the set of system limits based at least in part on weather conditions (e.g., cloud cover). For example, when operating at or above clouds, the rotor assemblies 128 may not need to be tightly controlled for noise because clouds can dissipate and/or reflect sound. Therefore, when operating above clouds, an aircraft can be louder because the clouds can dissipate or deflect the sound upward (away from the ground). However, when operating just below clouds, an aircraft should be more tightly controlled for noise (e.g., particularly quiet) because the clouds can deflect the sound downward (toward the ground and the acoustic area of interest).

The rotor driver module 112 may employ a dynamic model of the rotor controller 116 to provide the noise controller 102 with an understanding of the limits of the rotor controller 116 (e.g., step response time) that will influence the performance of various noise control schemes. For example, a gas turbine cannot quickly change RPM, therefore an acoustic control scheme based on fast RPM modulation may not be useful for aircraft that use a gas turbine as the mechanical device 124.

The aircraft layout module 114 is configured to provide a set of configuration data describing the configuration of the aircraft and/or the rotor system 126. For example, the configuration data may describe the rotor system 126 placement/layout in space, propeller/rotor blade characteristics, fuselage layout, etc. The configuration data may further describe any aircraft components that are major influencers on the sound propagation (e.g., fuselage). These various attributes may be used by the noise controller 102 to calculate acoustic propagation and interference (e.g., calculating the needed phase delays to achieve beamforming may be accomplished using the relative locations of the noise sources vis-à-vis an acoustic area of interest using is a trigonometry). This information may be combined with directivity models of the sources to determine the acoustic behavior.

Rotor System 126.

The acoustic radiation control system 100 includes a plurality of rotor systems 126 coupled to the noise controller 102. Each rotor system 126 may include a rotor controller 116, a rotor feedback device 118, and a rotor assembly 128 (e.g., a rotor 120 and a mechanical device 124 to rotate the rotor 120). The mechanical device 124 may be an electric motor, such as DC-brushless motor, although other mechanical devices 124 are contemplated, such as gas turbine engines, piston engines, etc.

The rotors 120 may be arranged in various configurations and with one or more blades (e.g., 1 to 25 or more blades, more preferably 2 to 20 blades, even more preferably 2 to 10 blades, and most preferable 2 to 6 blades). The one or more rotor blades may be adjustable in terms of blade pitch or other parameters (e.g., integrated flap, deicing bladder, etc.). The blade pitch may be controlled, for example, by a swashplate connected to the flight control system 106 and/or the noise controller 102. In certain aspects, the rotors 120 may employ a single rotor blade with a counterweight to provide balance. Further, the one or more rotor blades may be designed to be inherently low noise.

The acoustic radiation control system 100 is not restricted to a predetermined number of rotor systems 126. To that end, the acoustic radiation control system 100 is illustrated as having first, second, and $n^{th}$ rotor systems 126, where rotor n 120n represents the $n^{th}$ rotor on the aircraft. The acoustic radiation control system 100 is flexible in that it does not require that the rotors 120 or the rotor system 126 be aligned in any particular plane or other configuration.

In operation, the rotor controller 116 controls the mechanical device 124 and/or the rotor 120. The rotor controller 116 may control, for example, the speed of the rotor 120 (e.g., the RPM) by controlling current (or throttle/fuel flow) to the mechanical device 124. The rotor controller 116 can also control or adjust the blade pitch, shaft position, current draw, thrust, phase for each electric motor, etc. For example, where the mechanical device 124 is an electric motor, the rotor controller 116 may control the electric motor by adjusting the operating current to the electric motor via a current controller in response to, for example, a flight setting command from the noise controller 102 and/or the flight control system 106.

The rotor feedback device 118 uses one or more sensors to monitor dynamically one or more parameters of the rotor assembly 128. The one or more parameters may include, for example, blade pitch, shaft position, RPM, noise level, current draw, thrust, phase for each electric motor, etc. The one or more parameters may be dynamically communicated to the noise controller 102 by the rotor feedback device 118 as a data-stream of rotor parameter data.

The mechanical devices 124 can be tuned such that they each produce the same set of frequencies. In the case of an aircraft with varying rotor 120 radii, for example, different RPMs and/or blade pitches may be selected by the noise controller 102 to achieve the desired acoustic frequency content and thrust performance.

Flight Control Components.

The flight control components include a flight control interface 108 and the flight control system 106. The flight control interface 108 provides for communication of aircraft flight characteristics between a high-level operator (e.g., an autopilot, human pilot, etc.) and low-level flight control system to provide flight commands of the desired aircraft behavior (e.g., commanded flight settings). The commanded flight settings may include rotor assembly commands and/or navigational commands, such as a target waypoint location, rotor speed/RPM, blade pitch, etc. The flight control interface 108 may include one or more user-actuated input devices, such as physical buttons, physical switches, a digitizer (whether a touch pad, or transparent layer overlaying a display device), and other input devices. The flight control interface 108 may further include one or more display devices, such as one or more LEDs, LCD screens, speakers, alarms, etc.

The flight control interface 108 may be operatively coupled with one or more cockpit controls, such as primary flight controls (stick/yoke, stick, side-stick or collective, rudder pedals, brakes, and throttles) and the secondary flight controls (e.g., switches, knobs, rockers, fuses, etc.). The cockpit controls may be local (i.e., on the aircraft) or remote (e.g., off the aircraft and communicatively coupled via a network, such as wireless communication).

The flight control system 106 is communicatively coupled with the noise controller 102. The flight control system 106 is configured to translate the commanded behaviors from the operator into one or more commanded flight settings reflecting individual control effector commands for the aircraft, such as control surfaces, setting for the rotor assembly 128. In a traditional system, commands from the flight control system 106 would be directly linked to the rotor controller 116. When using an acoustic radiation control system 100, however, the flight control system 106 instead passes the one or more commanded flight settings (e.g., original commanded flight settings) to the noise controller 102, which can relay and/or modify the one or more commanded flight settings (e.g., as adjusted commanded flight settings) to the rotor system 126. It is contemplated, however, that the functionality of the acoustic radiation control system 100 may be integrated with the flight control system 106 as a single system.

The flight control system 106 may include, or communicate with, existing flight control devices or systems, such as those used in fixed-wing aircraft and rotary-wing aircraft. To that end, a communication system may be provided to enable the flight control system 106 to communicate with other devices (including remote or distant devices) via, for example, a network. The communication system may receive communication commands and configuration data from the flight control interface 108, while sending status and response information from the communication system to the flight control interface 108.

Other Aircraft System Components. The noise controller 102 and/or the flight control system 106 may also be communicatively coupled with an onboard data storage device (e.g., hard drive, flash memory, or the like), a wireless communication device, or virtually any other desired service (s). The noise controller 102 and/or the flight control system 106 may further be communicatively coupled with navigational devices, such as an inertial navigation system ("INS") communicatively coupled with an inertial measurement unit ("IMU") and/or a global positioning system ("GPS")

receiver. The GPS gives an absolute drift-free position value that can be used to reset the INS solution or can be blended with it by use of a mathematical algorithm, such as a Kalman Filter. The flight control system 106 may further be coupled with an intelligence, surveillance, and reconnaissance ("ISR") surveillance payload, which may be used to collect data, monitor an area, and/or provide feedback to the flight control system 106. For example, the aircraft may be equipped with one or more cameras, audio devices, and other sensors. Any video, or other data, collected by the aircraft may be communicated to a ground control station in real-time, wirelessly. The aircraft may be further equipped to store said video and data to the onboard data storage device.

Noise Modification Schemes.

The noise controller 102 can employ one or more of a plurality of noise modification schemes (and other noise-quality improvement techniques) to generate the regulated flight settings and/or to achieve a target acoustic behavior. A few example noise modification schemes include, for example, beamforming, spectral tone spreading, tailored throttle change profiles, or exploitation of frequency masking.

By way of example, the noise controller 102 may employ beamforming techniques to cancel the noise and/or direct the noise toward (or away from) a specific area (e.g., an acoustic area of interest). To initiate the beamforming, an operator may input a command (e.g., a beam direction, such as 45 degrees azimuthal) to the noise controller 102 (via the noise control interface 104). In response, the noise controller 102 may modify the noise profile of the aircraft to achieve an acoustic behavior that directs the noise toward (or away from) a predetermined location (e.g., complying with a target acoustic behavior). The beam direction may also be automatically determined by the noise controller 102 based on geography data from the GIS or images captured by the ISR. For example, the GIS may identify a specific geographical region has having a dense population. Using the geographic data, beamforming techniques may be employed to automatically and/or dynamically modify the noise to have an acoustic behavior to avoid the specific geographic region.

To illustrate, FIGS. 2a through 2c depict the acoustic radiation patterns 204 emitted by an example fixed wing aircraft 202 with two wing-mounted rotor assemblies 128. Specifically, FIG. 2a illustrates a top plan view 200a of the acoustic radiation patterns 204 of a fixed wing aircraft 202 at a predetermined altitude (A) vis-à-vis a distant acoustic area of interest, while FIGS. 2b and 2c illustrate, respectively, a front elevational view 200b and a side elevational view 200c.

The example acoustic area of interest is an observer 206 located at: (1) a longitudinal distance ($D_{Long}$) forward of the two wing-mounted rotor assemblies 128a, 128b; (2) a first lateral distance ($D_{Lat\_1}$) from the port-side rotor assembly 128a and a second lateral distance ($D_{Lat\_2}$) from the starboard-side rotor assembly 128b; and (3) a vertical distance ($D_V$) below the fixed wing aircraft 202. At this location, the distance from the observer 206 to the two acoustic radiation patterns 204 (e.g., from rotor assemblies 128a, 128b), which is identified as vectors $Path_1$ and $Path_2$, is unequal. $Path_2$ is greater (longer) than $Path_1$ because the starboard-side rotor assembly 128b is further away from the observer 206 (i.e., $D_{Lat\_2}$ is greater than $D_{Lat\_1}$). Moreover, the nose end of fuselage 208 may partially shield the observer 206 from the starboard rotor assembly 128b.

The different distances and obstruction(s) each influence the noise experienced by the observer 206. Using the known location(s) of the acoustic radiation pattern(s) 204 and one or more observer(s) 206, the noise controller 102 may calculate acoustic propagation and interference to control noise (whether directed toward or away from the observer) along one or more vectors (e.g., $Path_1$ and $Path_2$). For example, the noise controller 102 can calculate the needed phase delays to achieve desired beamforming vectors using trigonometry (e.g., using the known distances, e.g., $D_V$, $D_{Long}$, $D_{Lat}$, etc.), which may be combined with directivity models of the sources to determine the acoustic behavior.

Beamforming allows the acoustic energy to be steered to desirable directions (e.g., aiming a null, a portion of the acoustic radiation pattern that is very quiet, in the direction of nearby people). Acoustic beamforming can be accomplished by tuning each of the individual frequency content and phases of each mechanical device 124 (e.g., an electric motor). For example, beamforming techniques may control each mechanical device 124 to change the directionality of the array, thereby defining a pattern of constructive and destructive interference in the wave front. The various aircraft controllers and systems (e.g., the acoustic radiation control system 100, or components thereof) may be provided via an electronics module, which may be integrated with the airframe, such as a fuselage, or provided via a separate housing or pod.

While FIGS. 2a through 2c illustrate fixed-wing aircraft with two rotor assemblies 128, the acoustic radiation control system 100 is not limited to a particular aircraft configuration or number of rotor assemblies. Indeed, the acoustic radiation control system 100 is aircraft and aircraft configuration agnostic, therefore it may be incorporated into virtually any aircraft that employs one or more rotor assemblies 128 to generate lift and/or thrust, including, inter alia, rotor-craft (including helicopters and multi-rotor aerial vehicles), fixed-wing aircraft (including flying wing aircraft), tilt-rotor aircraft, tilt-wing aircraft, etc. Examples include, without limitation, the CESSNA-421 aircraft. NORTHROP XB-35 aircraft. DIAMOND DA42 aircraft etc.

Figure 3:
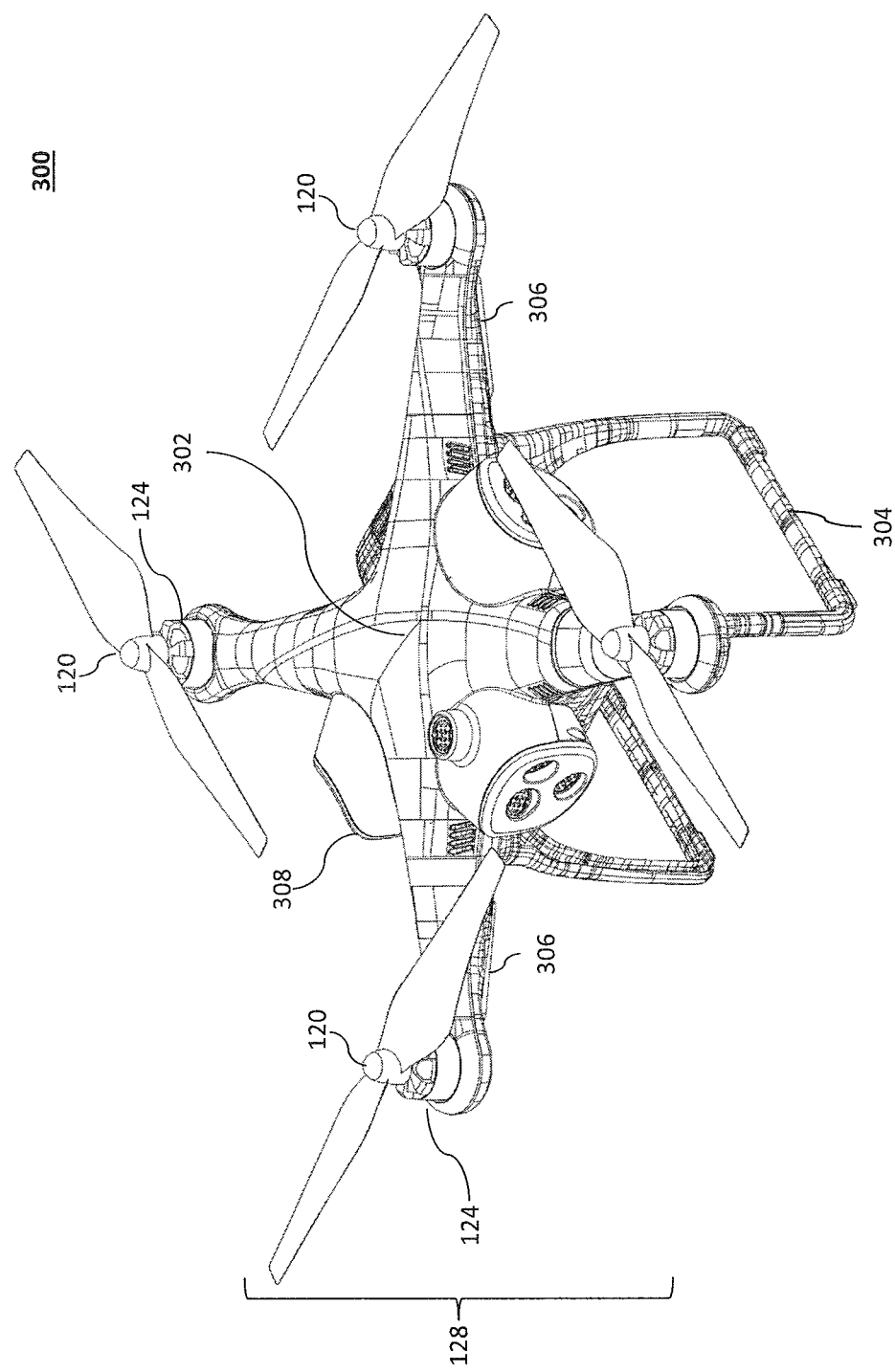
FIG. 3 illustrates a second example aircraft suitable for use with an acoustic radiation control system.

FIG. 3 illustrates an example multi-rotor aerial vehicle 300 that may be configured with an acoustic radiation control system 100. As illustrated, the multi-rotor aerial vehicle 300 may include an airframe 302, landing gear 304 (e.g., skids or wheeled landing gear), a plurality of booms 306, and a plurality of rotor assemblies 128. The airframe 302 may be coupled with a proximal end of each of the plurality of booms 306 such that the distal ends of the plurality of booms 306 extend radially from the airframe 302 (e.g., when viewed form the top, in an "X" arrangement, as illustrated). The airframe 302 and the plurality of booms 306 may be fabricated as a singular unit, or as separate components to be coupled to one another. The distal end of each of the plurality of booms 306 may be coupled with a rotor assembly 128, each of which is illustrated as a rotor 120 coupled with a mechanical device 124 to drive/rotate the rotor 120. The mechanical device 124 may be an electric motor controlled via an electronic speed controller (ESC). While the mechanical devices 124 are illustrated as positioned at the distal end of the boom 306, the mechanical devices 124 (or a single mechanical device 124) may instead be positioned in the airframe 302 and configured to drive (rotate) one or more rotors 120 via a gearbox and/or a driveshaft between the mechanical device 124 and the one or more rotor 120.

While the multi-rotor aerial vehicle 300 is illustrated as having an airframe 302 with four booms 306 (each with a single rotor assembly 128 at the distal end of the boom 306), one of skill in the art would appreciate that additional, or fewer, booms 306 and/or rotor assemblies 128 may be employed to achieve a desired function. Further, while each boom 306 is illustrated as having only a single rotor assembly 128, multiple rotor assemblies 128 may be provided at the distal end of each boom 306. For example, a crossmember may be positioned at the distal end of each boom 306 and arranged to space the rotor assemblies 128 from one another (e.g., perpendicularly to the length of the boom 306) to prevent interference between rotors 120. The multi-rotor aerial vehicle 300 may be equipped with one or more payload pods 308 comprising one or more cameras, audio devices, and other sensors to provide ISR functionality.

Figure 4:
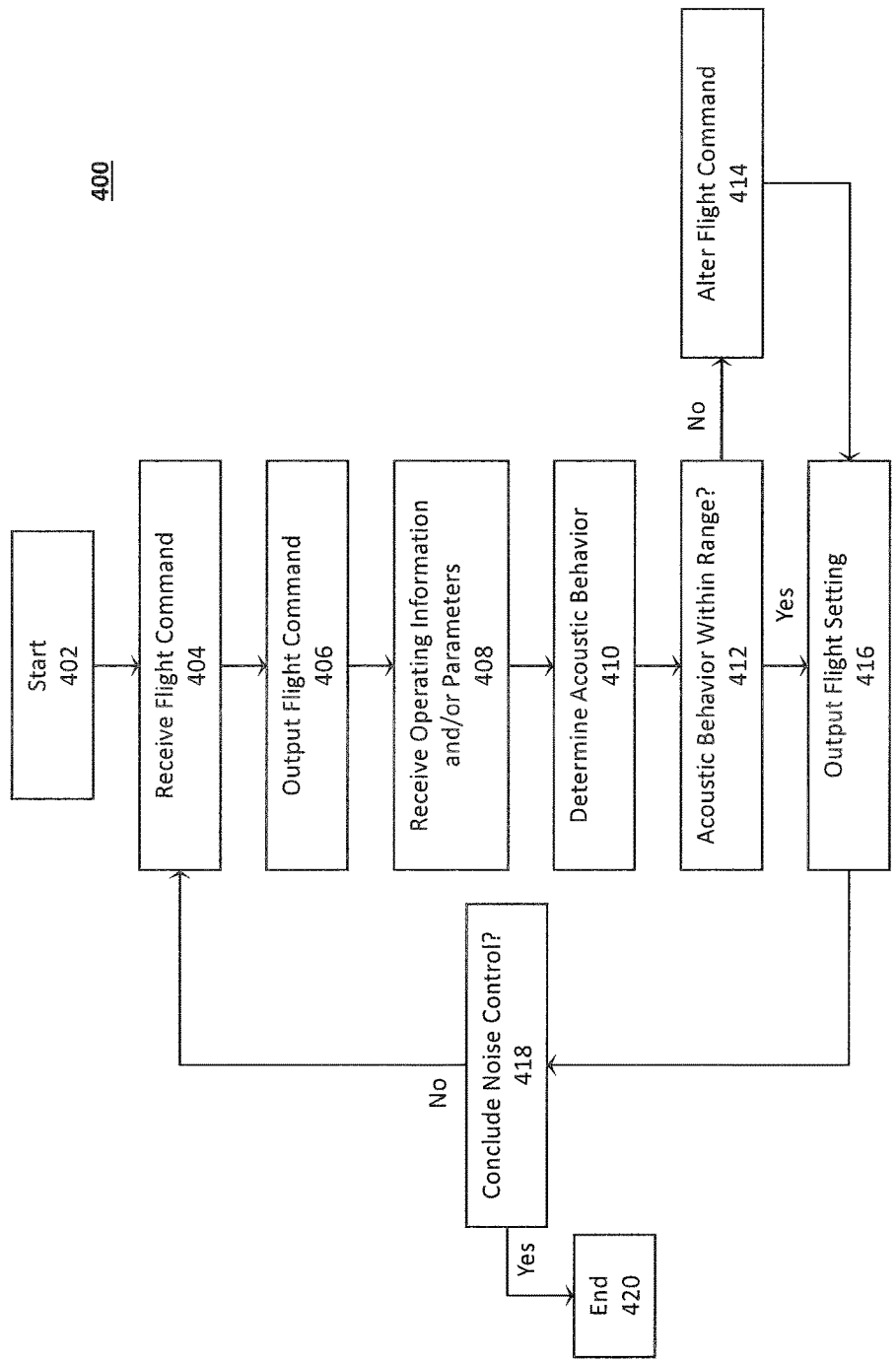
FIG. 4 illustrates an exemplary acoustic radiation control process for an acoustic radiation control system.

FIG. 4 illustrates an exemplary acoustic radiation control process 400 for an acoustic radiation reduction system 100. While the acoustic radiation control process 400 is illustrated as having steps 404 through 420, one of skill in the art would appreciate that fewer or additional steps may be implemented. For example, one or more modes may be omitted from the acoustic radiation control process 400, or performed separately and/or upon request. Moreover, the order in which the steps are performed may be adjusted depending on the needs of the aircraft.

Upon startup at step 402, the acoustic radiation reduction system 100 may be configured to, via a processor of said noise controller 102, cycle through multiple steps, starting with step 404. At step 404, the noise controller 102 receives a commanded flight setting from, for example, the flight control system 106 (e.g., an original commanded flight setting).

At step 406, the noise controller 102 may output the commanded flight setting to one or more rotor systems 126. For example, the commanded flight setting from the flight control system 106 may be communicated to a rotor controller 116 of each of the one or more rotor systems 126.

At step 408, the noise controller 102 receives operating parameter data (e.g., operating information and/or parameters) from, for example, from one or more of a plurality of input modules 122. The operating parameter data may include, for example, a desired noise modification scheme, parameters of the particular noise modification, a range of flight setting adjustment limits, one or more models for the rotor controller 116, aircraft configuration, etc.

At step 410, the noise controller 102 determines the acoustic behavior of the noise generated by the one or more rotor assemblies 128 in response to the commanded flight setting. In one example, the noise controller 102 may be configured to determine the acoustic behavior at the one or more rotor systems 126 based at least in part on the commanded flight setting and/or the operating parameter data.

The noise controller 102 may determine the acoustic signature of the aircraft (e.g., the total/aggregate acoustic behavior of all rotor assemblies 128 and other noise sources associated with the aircraft). Alternatively, the noise controller 102 may be configured to determine separately the acoustic behavior of each rotor assembly 128 or noise source to determine the aggregate acoustic behavior of the aircraft.

The noise controller 102 may be configured to measure and/or calculate the acoustic behavior of the rotor assemblies 128 using one or more sensors. Using sensors ensures that the aggregate acoustic behavior of the aircraft is based on the rotor assemblies' 128 actual response to the commanded flight setting from the flight control system 106 (e.g., via rotor feedback devices 118). For example, microphones and/or other audio sensors may be provided at or adjacent/near each of the one or more rotor assemblies 128 to measure the aggregate acoustic behavior (e.g., a waveform, noise map, etc.) of the aircraft.

Alternatively, the acoustic behavior of the aircraft may be determined using modeling without actually passing the commanded flight setting to the rotor system 126, in which case step 406 may be omitted. For example, the aggregate acoustic behavior may be determined through calculations or a look up table of known acoustic behaviors for various aircraft configurations vis-à-vis the available/known commanded flight settings.

At step 412, the noise controller 102 determines whether the aggregate acoustic behavior determined at step 410 complies with a target acoustic behavior or profile (e.g., is within a predetermined deviation/range of a desired acoustic behavior or profile). The target acoustic behavior or profile may be a static value (or set/range of values) associated with the aircraft or dynamically selected and/or updated by the operator. For example, the target acoustic behavior may be received dynamically by the noise controller 102 from the noise control interface 104, the flight control system 106, and/or the plurality of input modules 122. If the aggregate acoustic behavior of the aircraft is not within the target acoustic behavior range, the process continues to step 414. If the aggregate acoustic behavior of the aircraft is within the target acoustic behavior range, the process continues to step 416.

At step 414, the noise controller 102 generates (e.g., determines/calculates) a regulated flight command (e.g., adjusted commanded flight settings) that, when communicated to the one or more rotor systems 126, is predicted to generate a noise that complies with the target acoustic behavior range.

At step 416, the noise controller 102 outputs a flight setting (either the commanded flight setting or the regulated flight setting) to the one or more rotor systems 126 (e.g., via the rotor controller 116). The flight setting communicated at step 414 may be contingent upon whether the measured acoustic behavior was compliant at step 412. Specifically, if the measured acoustic behavior was compliant, the commanded flight setting is sent to the one or more rotor systems 126, otherwise the regulated flight setting from step 414 is sent to the one or more rotor systems 126.

At step 418, the acoustic radiation reduction system 100 determines whether the acoustic radiation control process 400 should be concluded (e.g., based on an input from the noise control interface 104 and/or flight control interface 108). If the acoustic radiation control process 400 is to be concluded, the process ends at step 420. At step 420, the aircraft may be shut off or simple resume normal operation based on flight commands from the flight control system 106 without modification by the acoustic radiation reduction system 100. Otherwise, the process 400 returns to step 404, whereby the process repeats for the next commanded flight setting.

Figure 5:
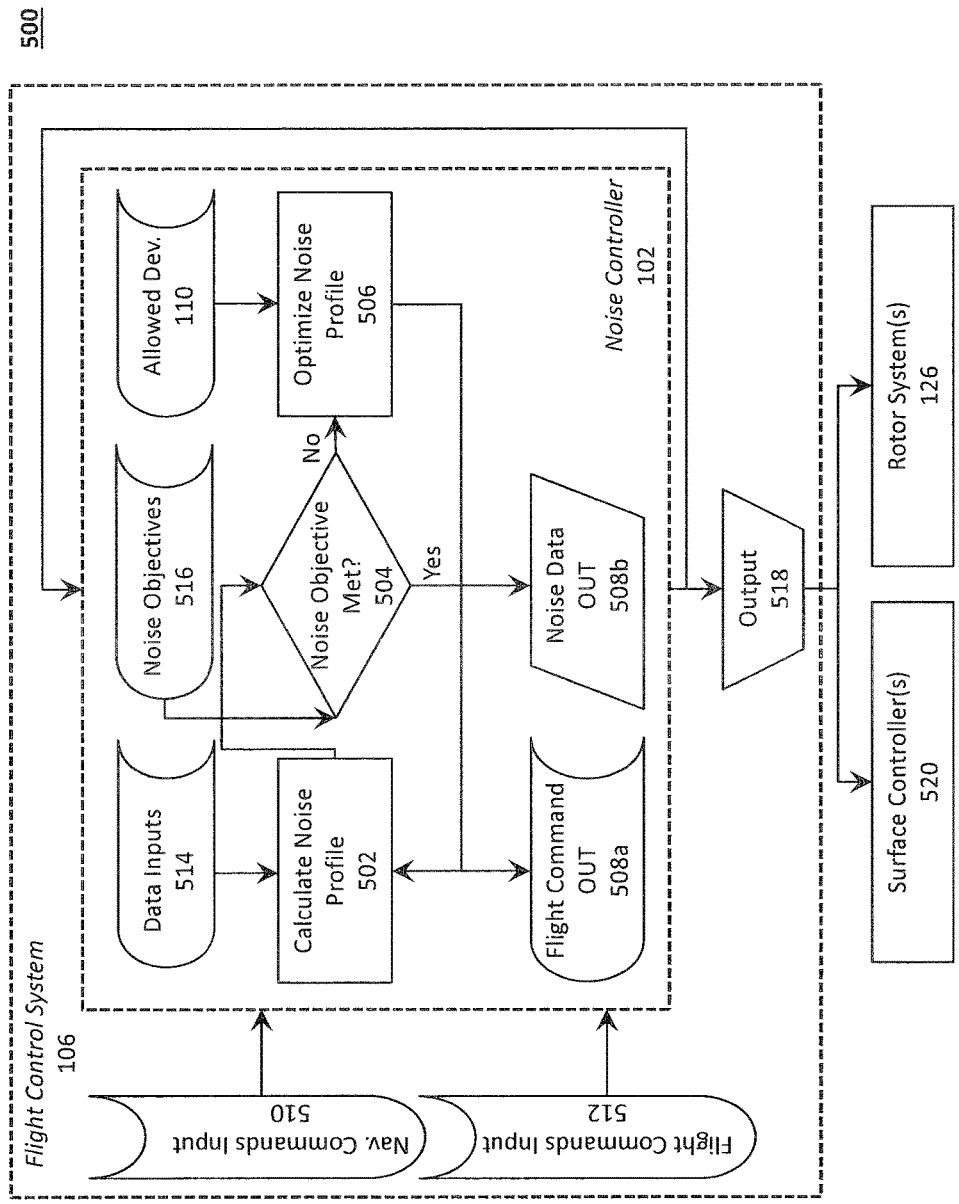
FIG. 5 illustrates a functional diagram for a flight control system embodying an acoustic radiation control process.

FIG. 5 illustrates a functional diagram 500 for a flight control system 106 embodied with an acoustic radiation control process, such as the acoustic radiation control process 400. As can be appreciated, a person of skill in the art may elect to loosely or tightly integrate the acoustic radiation control process 400 with flight controller processes of the flight control system 106. That is, the acoustic radiation control process 400 may be placed between the flight control system 106 and the rotor system(s) 126, or integrated directly into the flight control system 106.

The flight controller processes can include a state estimation process (e.g., in response to navigational command inputs 510) and trajectory optimization process (e.g., in response to flight command input 512). As can be appreciated, the state estimation process may employ taking multiple sensor inputs and fusing them into a unified estimate of the aircraft's position, orientation, and other health/status parameters, while the trajectory optimization process computes a preferred trajectory for the aircraft based at least in part on knowledge of the aircraft's state (e.g., from the state estimation process) and capabilities. The trajectory optimization process can produce the command outputs to the control surfaces 520 and rotor system(s) 126 via the output 518.

The navigational command inputs 510 may include, for example, information (e.g., data representing one or more parameters) from the navigational devices or systems, such as INS, IMU, GPS, etc., while flight command input 512 includes flight commands received from the flight control interface 108, such as pilot/autopilot navigational commands.

At element 502, the noise controller 102 can calculate a noise profile and output the noise parameters for the current state of the aircraft and commanded flight condition of the aircraft using information (e.g., aircraft state data, GIS data, and feedback data) available from various data inputs 514. The various data inputs 514 may include, for example, one or more rotor feedback devices 118, rotor driver module 112, aircraft layout module 114, flight control system 106, etc.

The noise controller 102 may process the information (e.g., via a processor) available from various data inputs 514 to output noise data, including, for example, a global noise parameter, a maximum/minimum value, or other informative values about the acoustics of the aircraft.

At element 504, the noise controller 102 may determine whether the noise data indicates that the commanded flight setting(s) complies with one or more noise objective inputs 516. The one or more noise objective inputs 516 may be received from the noise control interface 104.

If the one or more noise objectives are not met at step 504, the process proceeds to step 506, where one or more of the above-described noise modification schemes (e.g., beamforming) are applied to optimize the noise before generating the data outputs and outputting adjusted commanded flight setting(s) as commanded flight settings 508*a* to the output 518.

If the noise objective inputs 516 are met by the commanded flight setting(s), the noise controller 102 outputs the original commanded flight setting(s) as commanded flight settings 508*a* to the output 518 without modification and the noise data 508*b* as feedback. As illustrated, the output 518 may be communicatively coupled with one or more rotor systems 126 and surface controllers 520 (e.g., airfoil surfaces, such as flaps, rudder, etc.). The output 518 may further provide feedback dynamically to the noise controller (e.g. via element 502).

If the noise objective inputs 516 are met by the commanded flight setting(s), the noise controller 102 outputs the original commanded flight setting(s) as commanded flight settings 108*a* to the output 518 without modification and the noise data 508*b* as feedback. As illustrated, the output 518 may be communicatively coupled with one or more rotor systems 126 and surface controllers 520 (e.g., airfoil surfaces, such as flaps, rudder, etc.). The output 518 may further provide feedback dynamically to the noise controller (e.g. via element 502).

While the subject disclosure is described with regard to aircraft applications, the aircraft is presented as an exemplary platform to demonstrate the acoustic radiation control system described herein. Indeed, one of skill in the art would appreciated that the underlying principles may be used in other applications where it is desirable to limited noise generated by a fan or rotor system, including non-aircraft rotor or fan arrays. Example applications include, heating, ventilation, and air conditioning (HVAC) systems that use fans for cooling, wind turbines, cooling systems for electronics, etc.

Although various embodiments have been described with reference to a particular arrangement of parts, features, and like, these are not intended to exhaust all possible arrangements or features, and indeed many other embodiments, modifications, and variations will be ascertainable to those of skill in the art. Thus, it is to be understood that the invention may therefore be practiced otherwise than as specifically described above. The above-cited patents and patent publications are hereby incorporated by reference in their entirety.

What is claimed is:

1. A system for controlling acoustic radiation in an aircraft, the system comprising:
   a plurality of rotor systems, each of the plurality of rotor systems having a rotor, a motor to rotate the rotor, and a rotor controller to control operation of the motor,
   wherein, upon receipt of a commanded flight setting from a flight control system, the plurality of rotor systems are configured to generate, individually and in aggregate, desired acoustic radiation having a first acoustic behavior; and
   a noise controller operatively coupled with the flight control system and each of the plurality of rotor systems to regulate acoustic radiation from the plurality of rotor systems,
   wherein the noise controller is configured to regulate the commanded flight setting from the flight control system and to output a regulated flight setting to the plurality of rotor systems, and
   wherein, upon receipt of the regulated flight setting from the noise controller, the plurality of rotor systems are configured to generate, individually and in aggregate, acoustic radiation having a second acoustic behavior that is different from the first acoustic behavior, and
   wherein the noise controller is configured to dynamically adjust directionality of the acoustic radiation from the plurality of rotor systems via beamforming techniques to aim a null portion of the acoustic radiation toward an acoustic area of interest.

2. The system of claim 1, wherein the noise controller is configured to regulate the commanded flight setting based at least in part on noise configuration data from a noise control interface coupled to the noise controller.

3. The system of claim 2, further comprising one or more input modules, wherein the noise controller is configured to regulate the commanded flight setting based at least in part on operating parameter data from said one or more input modules.

4. The system of claim 3, wherein the operating parameter data includes at least one of: (1) flight setting adjustment limits; (2) one or more models for the rotor controller; and (3) aircraft configuration.

5. The system of claim 2, wherein the noise configuration data specifies a target acoustic behavior.

6. The system of claim 5, wherein the noise controller is configured to compare the second acoustic behavior with the target acoustic behavior to determine whether the second acoustic behavior complies with the target acoustic behavior.

7. The system of claim 1, wherein the noise controller is configured to automatically determine the acoustic area of interest as a function of information received from an onboard geographic information system (GIS) or an onboard camera.

8. The system of claim 1, wherein directionality of acoustic radiation from the plurality of rotor systems is controlled by regulating a frequency content and phase of each rotor within the plurality of rotor systems.

9. The system of claim 1, wherein the noise controller is configured to control thrust from each rotor within the plurality of rotor systems by regulating each rotor's blade pitch.

10. The system of claim 1, wherein each of the plurality of rotor systems includes a rotor feedback device to provide feedback to the flight control system via the noise controller.

11. The system of claim 1, wherein each of the plurality of rotor systems is tuned to produce a single frequency.

12. A method for controlling acoustic radiation in an aircraft having a plurality of rotor systems, the method comprising:
receiving, at a noise controller, a commanded flight setting from a flight control system;
receiving, from a noise control interface, noise configuration data, wherein the noise configuration data is configured to specify a target acoustic behavior for the plurality of rotor systems;
regulating the commanded flight setting to generate a regulated flight setting, wherein the regulated flight setting is generated based at least in part on the noise configuration data;
communicating the regulated flight setting to at least one of the plurality of rotor systems; and
dynamically adjusting directionality of the acoustic radiation from the plurality of rotor systems via beamforming techniques to aim a null portion of the acoustic radiation toward an acoustic area of interest.

13. The method of claim 12, further comprising a step of determining an acoustic behavior for the plurality of rotor systems generated in response to the regulated flight setting.

14. The method of claim 13, further comprising a step of comparing the acoustic behavior generated in response to the regulated flight setting with the target acoustic behavior.

15. The method of claim 14, further comprising a step of regulating the regulated flight setting if the acoustic behavior does not comply with the target acoustic behavior.

16. The method of claim 12, wherein the noise controller is configured to automatically determine the acoustic area of interest as a function of information received from an onboard geographic information system (GIS) or an onboard camera.

17. The method of claim 12, wherein the regulated flight setting is configured to regulate a frequency content and phase of each motor within the plurality of rotor systems to adjust directionality of acoustic radiation from the plurality of rotor systems.

18. The method of claim 12, further comprising a step of receiving, from one or more input modules, operating parameter data, wherein the regulated flight setting is generated based at least in part on the operating parameter data.

19. The method of claim 18, wherein the operating parameter data includes at least one of: (1) flight setting adjustment limits; (2) one or more models for the rotor controller; and (3) aircraft configuration.

20. The method of claim 18, further comprising a step of tuning each motor within the plurality of rotor systems to distribute the acoustic energy across a range of frequencies as possible or otherwise optimize an acoustic character of each motor to reduce detectability and/or annoyance.

21. A system for controlling acoustic radiation, the system comprising:
plurality of rotor systems, each of the plurality of rotor systems having a rotor, a motor to rotate the rotor, and a rotor controller to control an operation of the motor; and
a noise controller operatively coupled with a flight control system and each of the plurality of rotor systems to regulate acoustic radiation from the plurality of rotor systems,
wherein the noise controller is configured to receive a commanded flight setting from the flight control system and to output a regulated flight setting to the plurality of rotor systems to regulate the acoustic radiation from the plurality of rotor systems to comply with a target acoustic behavior, and
wherein the noise controller is configured to dynamically adjust directionality of the acoustic radiation from the plurality of rotor systems via beamforming techniques to aim a null portion of the acoustic radiation toward an acoustic area of interest.

22. The system of claim 21, wherein the noise controller is configured to automatically determine the acoustic area of interest as a function of information received from an onboard geographic information system (GIS) or an onboard camera.

23. The system of claim 21, wherein the noise controller is configured to provide feedback to a control interface reflecting present and future performance of the system.

* * * * *